W. A. SPEAKMAN.
WASTE VALVE MECHANISM.
APPLICATION FILED JAN. 31, 1917.

1,258,371.

Patented Mar. 5, 1918.
2 SHEETS—SHEET 1.

W. A. SPEAKMAN.
WASTE VALVE MECHANISM.
APPLICATION FILED JAN. 31, 1917.
1,258,371.
Patented Mar. 5, 1918.
2 SHEETS—SHEET 2.
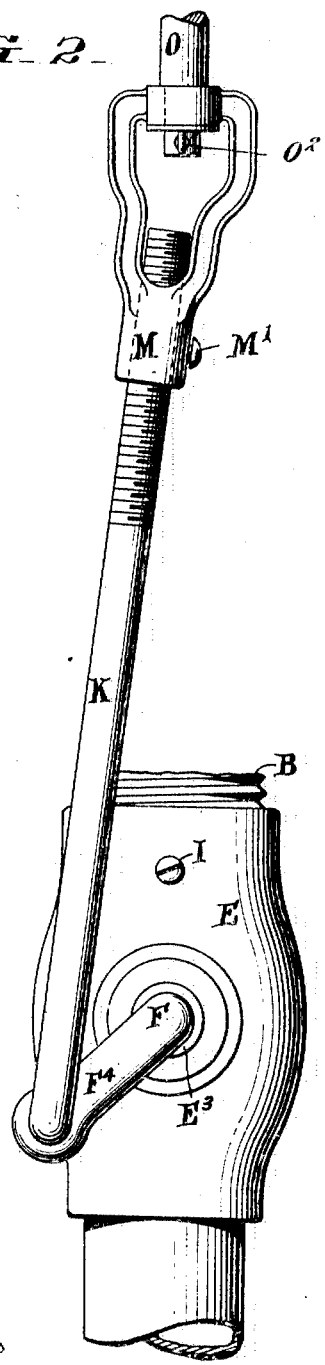
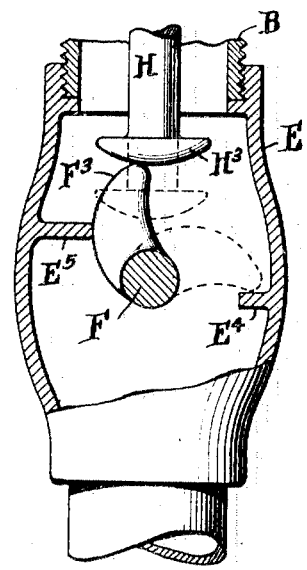
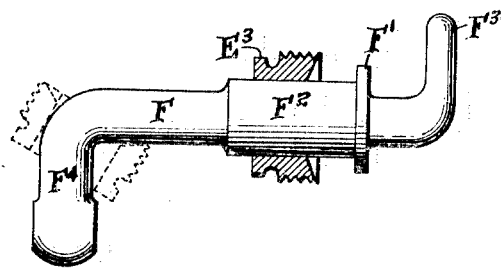

UNITED STATES PATENT OFFICE.

WILLARD A. SPEAKMAN, OF WILMINGTON, DELAWARE, ASSIGNOR TO SPEAKMAN SUPPLY & PIPE COMPANY, OF WILMINGTON, DELAWARE, A CORPORATION OF DELAWARE.

WASTE-VALVE MECHANISM.

1,258,371. Specification of Letters Patent. Patented Mar. 5, 1918.

Application filed January 31, 1917. Serial No. 145,601.

*To all whom it may concern:*

Be it known that I, WILLARD A. SPEAKMAN, a citizen of the United States of America, residing in Wilmington, in the county of New Castle and State of Delaware, have invented certain new and useful Improvements in Waste-Valve Mechanism, of which the following is a true and exact description, reference being had to the accompanying drawings, which form a part thereof.

My present invention consists in an improved waste valve mechanism for use in lavatories and the like, and the general object of my invention is to provide a simple and effective mechanism for the purpose.

The various features of novelty which characterize my invention are pointed out with particularity in the claims annexed to and forming a part of this specification. For a better understanding of the invention, however, and the specific objects obtained thereby, reference should be had to the accompanying drawings and descriptive matter in which I have illustrated and described a preferred embodiment of my invention.

Of the drawings:

Fig. 2 is an elevation taken at right angles to Fig. 1, showing a portion of the waste valve mechanism;

Fig. 3 is an elevation with parts broken away and partly in section on the line 3—3 of Fig. 1, and Fig. 4 is an elevation of a portion of the valve mechanism shown in Fig. 1.

Figure 1:
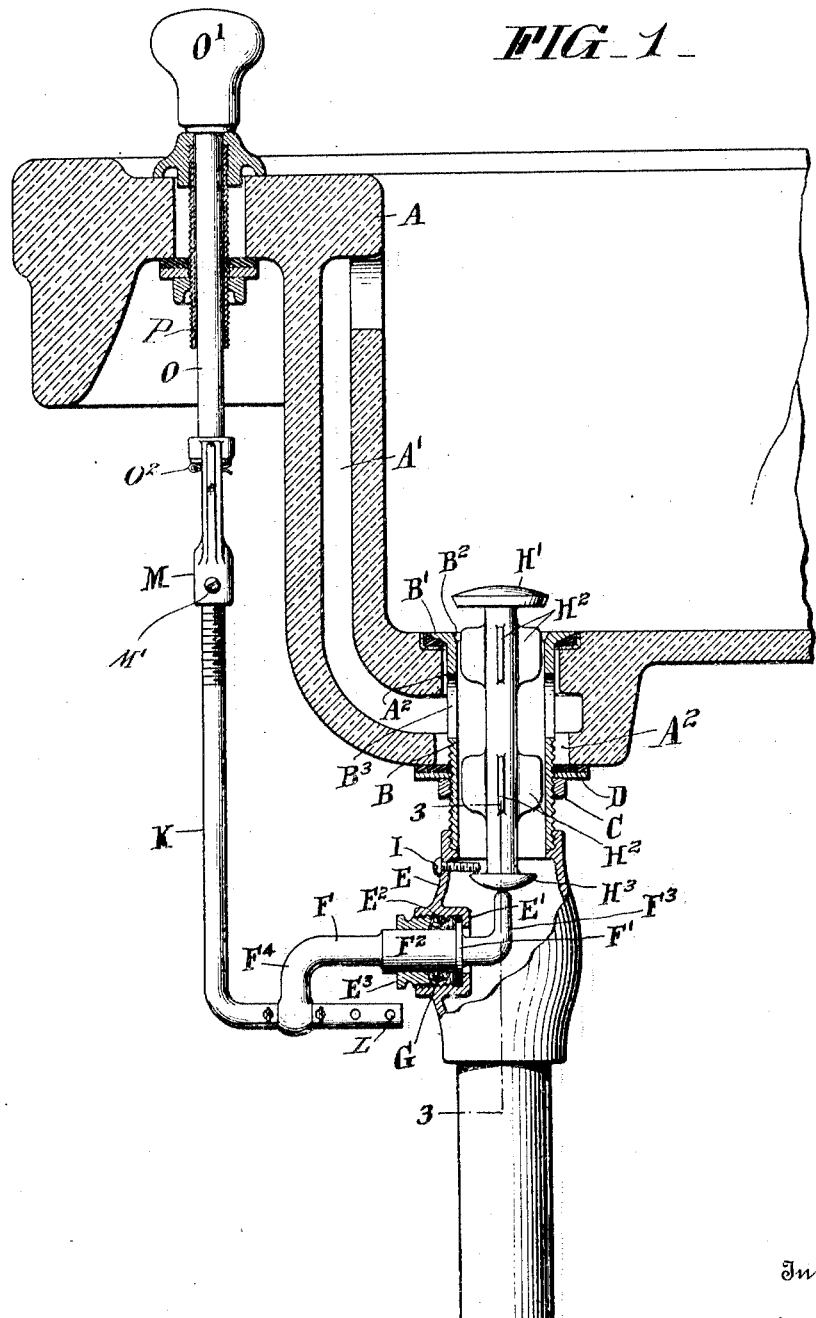
Figure 1 is a sectional elevation of a portion of a lavatory of conventional form to which my invention is applied.

In the drawings, A represents a lavatory basin and slab structure of conventional type. The structure A is formed with the usual overflow passage A', and the usual waste outlet passage $A^2$ in the bottom of the basin bowl. Mounted in the passage $A^2$ is the upper end of the waste conduit. As shown this comprises a tubular section B provided with an out-turned flange portion B' and a conical valve seat $B^2$ at its upper end and externally threaded at its lower end. Between its ends, the section B is provided with lateral ports $B^3$ communicating with the overflow passage A'. The section B is secured in place by a nut C screwed on to the threaded lower end of the section B and engaging a washer C interposed between the nut and the under side of the basin bowl.

In threaded engagement with the lower end of the tubular waste conduit section B is another section E of the waste pipe. This section is provided with an opening in one side to receive the rotatable valve operating member F, and has stuffing box provisions for preventing leakage out of the waste conduit along the member F. As shown, the member F is provided with a collar F' which fits against a flange E' forming the annular bottom or inner end of a stuffing box $E^2$ formed integral with the section C, and in which the cylindrical body portion $F^2$ of the member F is received. G represents a compressible packing in the box $E^2$, and $E^3$ represents an externally threaded ring which surrounds the portion $F^2$ of the member F and is in threaded engagement with the internally threaded stuffing box $E^2$ to compress the packing G. The inner end of the member F is in the form of a cam arm $F^3$, which may be swung back and forth between the full and dotted line positions shown in Fig. 3. Movement of the arm $F^3$ in the clockwise direction beyond the dotted line position of Fig. 3 is prevented by the stop rib $E^4$ formed on the inner wall of the member E, and turning movement of the arm $F^3$ in the opposite direction beyond the full line position of Fig. 3 is prevented by the stop rib $E^5$ also formed on the inner wall of the member E.

The purpose of the arm $F^3$ is to engage the lower end of the waste valve H and move it from the dotted line position into the full line position at Fig. 3. When in the full line position shown in Fig. 3, the valve H is wide open, as shown in Fig. 1. The valve H, as shown, comprises the conical valve portion H' proper, adapted to seat against the conical valve seat $B^2$, and a depending stem portion provided with lateral guide ribs $H^2$ and formed at its lower end with a foot portion $H^3$, the under side of which is directly engaged by the arm $F^3$ of the member F to open the valve. A screw I passing through a threaded orifice formed for the purpose in the upper end of the waste conduit section E extends over the foot portion $H^3$ of the valve, normally prevents the removal of the valve H. The partial retraction of the screw I permits the removal of the valve for cleaning or other purposes.

At its outer end the valve-operating member F is provided with an arm F⁴ which is apertured to provide a bearing, receiving the end portion of a member K. The lower member K is in the form of a rod bent at right angles to the body portion of the member. The lower end portion of the member K is formed with openings to receive cotter pins L fixing the axial position of this portion of the rod with respect to the arm F. Advantageously, as shown, there may be a plurality of these openings to permit of adjustment necessary in applying the waste valve to different lavatories. The upper end of the rod K is screwed into a threaded opening formed in the lower end of a yoke member M. The latter is formed at its upper end with an opening in which is swiveled the reduced lower end of the valve-operating plunger member O which passes upward through the basin slab and is provided at its upper end with the usual knob O'. Advantageously, as shown, the rods K and O, while lying in the same plane, are not in alinement with one another, but intersect at an angle, threaded opening in the yoke member M receiving the upper end of the member K and the passage of the member M receiving the lower end of the rod O, being correspondingly out of alinement with one another. In consequence of this arrangement, there is no tendency for the member M to rotate under the strains of use, and thus throw the valve-operating mechanism out of adjustment, even though a set screw M' employed to prevent such rotation should be lost or lose its effectiveness. The member M is provided with a passage at its upper end, receiving the reduced lower end of the rod O on which the member M is thus swiveled. A cotter pin O² is passed through the lower portion of the rod O to hold the member M on the latter.

Advantageously, as shown, the cylindrical body portion of the member F is appreciably larger in diameter than the outer portion of the member so that the washer member E³ may be moved into place in assembling the apparatus over the outer end F⁴ of the member F. It is, of course, possible to put the packing G in place in the same manner.

An important feature of my invention is the arrangement of the parts, as shown in Fig. 3, so that when the arm F³ is moved from the dotted line position of Fig. 3 into the full line position of Fig. 3, the valve-engaging portion of the arm F³ moves over the axis of rotation of the member F before the arm F³ engages the stop E⁵. In consequence, when the arm F³ is in the position shown in full lines in Fig. 3, pressure applied to the upper end of the waste valve, either manually or by the water escaping from the basin bowl, neither tends to close the waste valve or to put any strain on any portion of the valve-operating mechanism which could be injuriously affected thereby. When the knob O' is raised to close the waste valve mechanism the rod O is held in its upward position by the frictional resistance to the movement of the rod O through the guide sleeve P, and by the frictional resistance to the rotation of the member F in the stuffing box. Advantageously, the guide sleeve P extends downwardly to provide a stop adapted to be engaged by the upper end of the yoke member M on an upward movement of the latter approximately the same as that required to move the arm F³ into engagement with the stop E⁴. While in the normal condition of the apparatus but one of the two stops just provided to limit the upward movement of the rod O is necessary, the presence of the two stops prevents undesirable movement of either the rod O or the arm F, in case of an improper adjustment of the apparatus.

Having now described my invention, what I claim as new and desire to secure by Letters Patent, is:—

1. A waste valve mechanism comprising in combination a waste conduit having an inlet at its upper end, a valve controlling said inlet and having a stem portion extending downwardly into said conduit, a rotatable valve-operating member extending through and journaled in the wall of said conduit and provided within the conduit with a cam adapted to engage the lower end of the valve stem and lift the valve when said member is rotated, the parts being arranged to permit the valve engaging portion of the cam to swing over the axis of rotation of the operating member in moving from the valve closed to the valve open position, and a stop preventing movement of said cam in the valve opening direction far enough to permit the valve to close.

2. A waste valve mechanism comprising a combination, a reciprocating valve member, a rotatable valve operating member provided with a cam adapted to engage said valve member and move the latter from its closed to its open position when said operating member is rotated, the parts being arranged to permit the valve engaging portion of the cam to swing over the axis of rotation of the operating member in moving from the valve closed to the valve open position, and a stop preventing movement of said cam in the valve opening direction far enough to permit the valve to close.

3. A waste valve mechanism comprising in combination a waste conduit having an inlet at its upper end, a valve controlling said inlet, a rotatable valve operating member journaled in said conduit and provided with an external crank arm, a vertically movable plunger, a connecting rod pivotally connected at its lower end to said valve operating member, and a turn-buckle formed with two passages inclined each with respect to the other and receiving, one the upper end of said connecting rod, and the other the lower end of said plunger.

4. A waste valve mechanism comprising in combination, a waste conduit having an inlet at its upper end, a valve controlling said inlet, a rotatable valve operating member journaled in said conduit and provided with an external crank arm, a vertically movable plunger, a connecting rod pivotally connected at its lower end to said valve operating member, and a turn-buckle formed with two passages inclined each with respect to the other, and receiving, one the upper end of said connecting rod, and the other the lower end of said plunger, one of said members being threaded into the turn-buckle passage receiving it, and the other member being swiveled in the turn-buckle passage receiving it.

5. A waste valve mechanism comprising in combination a casing formed with a valve seated port, a lateral aperture and a casing portion surrounding said aperture and forming an external stuffing box chamber, a movable valve member controlling the flow through said port, a rotatable operating member passing through said lateral aperture and comprising an internal cam portion, an external crank portion, an intermediate body portion larger in diameter than said external portion, and a flange at the inner end of said body portion and adapted to bear against the bottom wall of said chamber, and an annular member surrounding the body portion of said valve operating member and adapted to be slipped over the outer crank end portion thereof, and in threaded engagement with said casing portion.

6. The combination with a lavatory comprising a basin slab, a basin bowl with a waste orifice at its bottom, of a waste conduit connecting with said orifice, a waste valve member for opening and closing said orifice, and comprising a portion extending downward into said conduit, a rotatable valve operating member projecting through and journaled in the wall of said conduit and provided within the latter with a cam portion adapted to engage and lift the valve when said member is rotated, stops carried by said conduit limiting the movements of said valve operating member, a vertically movable plunger passing through said basin slab, a tubular casing secured to and extending downward from said slab, and forming a guide for the plunger and a stop limiting the upward movement of the latter, and connections between said plunger and said valve opening member, whereby the reciprocation of the plunger rotates said member.

WILLARD A. SPEAKMAN.

Copies of this patent may be obtained for five cents each, by addressing the "Commissioner of Patents, Washington, D. C."